(12) United States Patent
Ode et al.

(10) Patent No.: US 8,773,843 B2
(45) Date of Patent: Jul. 8, 2014

(54) SOLID ELECTROLYTIC CAPACITOR, METHOD FOR PRODUCING THE SAME AND SOLUTION FOR SOLID ELECTROLYTIC CAPACITOR

(75) Inventors: Sachiko Ode, Saitama (JP); Tailu Ning, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 152 days.

(21) Appl. No.: 13/635,263

(22) PCT Filed: Mar. 11, 2011

(86) PCT No.: PCT/JP2011/055779
§ 371 (c)(1),
(2), (4) Date: Sep. 14, 2012

(87) PCT Pub. No.: WO2011/115011
PCT Pub. Date: Sep. 22, 2011

(65) Prior Publication Data
US 2013/0258554 A1    Oct. 3, 2013

(30) Foreign Application Priority Data
Mar. 16, 2010  (JP) ................. 2010-059690

(51) Int. Cl.
*H01G 9/028* (2006.01)
*H01G 9/025* (2006.01)
*H01G 9/00* (2006.01)

(52) U.S. Cl.
CPC ............... *H01G 9/028* (2013.01); *H01G 9/025* (2013.01); *H01G 9/0036* (2013.01); *H01G 9/155* (2013.01)
USPC ........... 361/525; 361/523; 361/528; 361/529; 361/517; 361/519

(58) Field of Classification Search
CPC ..... H01G 9/028; H01G 9/025; H01G 9/0036; H01G 9/155; H01G 11/52
USPC ......... 361/525, 523, 516–519, 528–529, 530, 361/503–504, 509–512
See application file for complete search history.

(56) References Cited

U.S. PATENT DOCUMENTS 7,916,455 B2 *  3/2011 Yoshida et al. ............... 361/523
7,948,740 B2 *  5/2011 Funahashi et al. ............ 361/523

(Continued)

FOREIGN PATENT DOCUMENTS

JP  63-158829 A  7/1988
JP  63-173313 A  7/1988

(Continued)

OTHER PUBLICATIONS

Office Action issued on Sep. 17, 2013 in the counterpart Japanese Application No. JP2010-059690, with English Abstract, seven (7) pages.

*Primary Examiner* — Nguyen T Ha
(74) *Attorney, Agent, or Firm* — Nath, Goldberg & Meyer; Jerald L. Meyer; Stanley N. Protigal (57) ABSTRACT

Provided is a solid electrolytic capacitor which retains a high capacitance and a low ESR and has high heat resistance. The solid electrolytic capacitor (10) is obtained by winding a porous anode foil (11) having a dielectric layer formed thereon and a cathode foil (14) together with separators (15) each interposed therebetween, the separators (15) having a solid electrolyte (13) supported thereon. Each layer of the solid electrolyte comprises a conductive composite (a) of a cationized conductive polymer with a polymer anion, a first hydroxy compound (b) having four or more hydroxy groups, and a second hydroxy compound (c) having an amino group and one or more hydroxy groups, the content of the conductive composite (a), in terms of mass proportion, being lower than that of the first hydroxy compound (b) and higher than that of the second hydroxy compound (c).

20 Claims, 1 Drawing Sheet

(56) References Cited

U.S. PATENT DOCUMENTS

| | | | |
|---|---|---|---|
| 8,000,085 B2 * | 8/2011 | Kobayashi et al. | 361/524 |
| 8,058,135 B2 * | 11/2011 | Merker et al. | 438/393 |
| 8,116,069 B2 * | 2/2012 | Tani et al. | 361/525 |
| 8,164,884 B2 * | 4/2012 | Nobuta et al. | 361/525 |
| 2007/0064376 A1 | 3/2007 | Merker et al. | |
| 2007/0171597 A1 | 7/2007 | Merker et al. | |
| 2010/0165546 A1 | 7/2010 | Yoshida et al. | |

FOREIGN PATENT DOCUMENTS

| | | |
|---|---|---|
| JP | 07-105718 A | 4/1995 |
| JP | 2003-037024 A | 2/2003 |
| JP | 2006-100774 A | 4/2006 |
| JP | 2006-287182 A | 10/2006 |
| JP | 2007-027767 A | 2/2007 |
| JP | 2007-096284 A | 4/2007 |
| JP | 2007-184317 A | 7/2007 |
| JP | 2007-335516 A | 12/2007 |
| JP | 2008-109068 A | 5/2008 |
| JP | 2008-109069 A | 5/2008 |
| JP | 2008-208166 A | 9/2008 |
| JP | 2009-009997 A | 1/2009 |
| JP | 2009-009999 A | 1/2009 |
| JP | 2009-505412 A | 2/2009 |
| JP | 2009-508342 A | 2/2009 |
| WO | 2007/020458 A1 | 2/2007 |
| WO | 2007/091656 A1 | 8/2007 |
| WO | 2007/097364 A1 | 8/2007 |
| WO | 2009/128401 A1 | 10/2009 |

* cited by examiner

SOLID ELECTROLYTIC CAPACITOR, METHOD FOR PRODUCING THE SAME AND SOLUTION FOR SOLID ELECTROLYTIC CAPACITOR

This is a National Phase Application filed under 35 U.S.C. §371 as a national stage of International Application No. PCT/2011/055779, filed on Mar. 11, 2011, claiming the benefit from Japanese Patent Application No. P2010-059690, filed on Mar. 16, 2010, the content of each of which is hereby incorporated by reference in its entirety.

TECHNICAL FIELD

The present invention relates to a solid electrolytic capacitor, a method for producing the same and a solution for a solid electrolytic capacitor.

BACKGROUND ART

In recent years, as the digitization of electronic devices proceeds, it is demanded that impedance (equivalent series resistance) in a high frequency region of capacitors used for electronic devices should be reduced. Conventionally, to meet the demand, so-called functional capacitors (hereinafter abbreviated to capacitors) have been used in which an oxide film of a valve metal such as aluminum, tantalum or niobium is used as a dielectric.

As shown in Patent Document 1, the structures of these capacitors commonly include an anode composed of a porous material of a valve metal, a dielectric layer formed by oxidation of the surface of the anode, a conductive solid electrolyte layer, and a cathode in which a carbon layer, a silver layer and the like are laminated. As the solid electrolyte layer, a conductive film containing a conductive polymer may be used.

As methods for forming the conductive film containing a conductive polymer, electrolytic polymerization methods in which a conductive layer composed of manganese oxide is formed in advance on the surface of a porous material of a valve metal and this is then used as an electrode and energized to carry out polymerization (see Patent Document 2) and chemical oxidation polymerization methods in which a precursor monomer which forms a conductive polymer is polymerized using an oxidizing agent are widely known (see Patent Document 3).

As a method for forming a conductive film other than the electrolytic polymerization methods and the chemical oxidation polymerization methods, for example, Patent Document 4 proposes a method, that is, aniline is subjected to chemical oxidation polymerization in the presence of a polymer anion having a sulfo group, a carboxy group or the like to prepare a water soluble polyaniline and an aqueous solution of the polyaniline is applied and dried to form a coating film. This method is believed that a conductive film with high conductivity can be easily formed.

The present inventors have already disclosed a capacitor including an anode composed of a porous material of a valve metal, a dielectric layer formed by oxidation of the surface of the anode, and a solid electrolyte formed on the dielectric, wherein the solid electrolyte is formed from a composition including a conductive polymer to which a nitrogen-containing aromatic compound is added (PEDOT/PSS polymer dispersed liquid) as an essential component.

The features of the composition forming the solid electrolyte are that functional capacitors such as an aluminum electrolytic capacitor and a tantalum capacitor can be easily produced (see Patent Document 5).

Meanwhile, an attempt to use conductive polymer dispersions as a solid electrolyte of a capacitor has been already carried out for more than 10 years. As additives of the conductive polymer dispersions as above, a conductive complex of a cationized conductive polymer and a polymer anion (see Patent Documents 1 to 5) and a hydroxy compound having an amino group and one or more hydroxy groups (Patent Documents 6 to 14) are disclosed.

LIST OF REFERRED DOCUMENTS

Patent Documents

Patent Document 1: JP 2003-37024 A
Patent Document 2: JP 63-158829 A
Patent Document 3: JP 63-173313 A
Patent Document 4: JP 7-105718 A
Patent Document 5: JP 2006-100774 A
Patent Document 6: JP 2007-027767 A
Patent Document 7: JP 2007-096284 A
Patent Document 8: JP 2009-009997 A
Patent Document 9: JP 2009-009999 A
Patent Document 10: JP 2006-287182 A
Patent Document 11: WO 2007/091656
Patent Document 12: JP 2008-109069 A
Patent Document 13: JP 2008-109068 A
Patent Document 14: JP 2009-508342 A

SUMMARY OF INVENTION

Technical Problem

When a solid electrolyte layer of a capacitor is formed, however, in the case of applying the methods for forming a conductive film described in Patent Documents 2 to 4, there is a problem which the withstand voltage of a capacitor decreases. Moreover, in the case of the electrolytic polymerization method described in Patent Document 2, due to forming a conductive layer composed of manganese oxide, the method is complicated, and further because the conductivity of manganese oxide is low, there is a problem which the effects of using a conductive polymer with high conductivity weaken.

In the case of the chemical oxidation polymerization method described in Patent Document 3, polymerization time is long and the polymerization need to be repeatedly carried out to maintain a film thickness, and thus the forming efficiency of a conductive film is low and further conductivity is low as compared to that obtained by the electrolytic polymerization. When the conductivity of a capacitor is low, there is a problem which equivalent series resistance (hereinafter referred to as ESR) increases.

Additionally, in the case of a condenser described in Patent Document 5, there is a problem which capacitance declines at high temperature.

In a condenser described in Patent Document 6, there is a problem which ESR is required to be reduced.

Meanwhile, about a conductive complex of a cationized conductive polymer and a polymer anion described in Patent Documents 1 to 5 and a hydroxy compound having an amino group and one or more hydroxy groups described in Patent Documents 6 to 14, an attempt to use conductive polymer dispersions which use these as additives as a solid electrolyte of a capacitor has many problems because most of dopants of the dispersions are polymer sulfonic acid, unlike an in-situ polymerization method of a precursor monomer forming a conductive polymer in a capacitor element, which method has been conventionally carried out. Thus, practical application has not been achieved in the present situation.

The present invention is proposed in view of the above-described problems. An object of the present invention is to provide a solid electrolytic capacitor which maintains low ESR and high heat resistance and has high stability to temperature. Another object of the present invention is to provide a method for producing a solid electrolytic capacitor, which method is capable of easily producing a capacitor with low ESR and high temperature stability. Still another object of the present invention is to provide a solution for a solid electrolytic capacitor, which solution is suitable for producing a capacitor with low ESR and high temperature stability.

Solution to Problem

To solve the above-described problems, an aspect of the present invention provides a solid electrolytic capacitor including at least an anode body composed of a porous material, a dielectric layer formed on the surface of the anode body and a cathode body, wherein the solid electrolytic capacitor has a solid electrolyte layer formed in contact with the dielectric layer, wherein the solid electrolyte layer includes at least a conductive complex (a) of a cationized conductive polymer and a polymer anion, a first hydroxy compound (b) having four or more hydroxy groups and a second hydroxy compound (c) having an amino group and one or more hydroxy groups.

The conductive complex (a) of a cationized conductive polymer and a polymer anion, which conductive complex (a) is an essential component of the present invention, is also disclosed in Patent Documents 1 to 6, and further the second hydroxy compound (c) having an amino group and one or more hydroxy groups is disclosed in Patent Documents 6 to 14. In Patent Documents 6 to 9, however, their usage methods are different from the present invention, and among these, Patent Documents 8 and 9 are only mentioned as examples of amines.

In Patent Document 6, an electric conductor is already equipped on the upper part of an anode dielectric, and thus the condenser described therein does not basically need to use the second hydroxy compound (c) component having an amino group and one or more hydroxy groups as described above, and is simply described to consider the possibility to prevent oxidation of an anode. In addition, Patent Document 14 is only mentioned as an example of amines.

Further, the conductive complex (a) of a cationized conductive polymer and a polymer anion, the first hydroxy compound (b) having four or more hydroxy groups and the second hydroxy compound (c) having an amino group and one or more hydroxy groups are merely disclosed in Patent Documents 10 to 13. However, examples in which these are used simultaneously are not disclosed.

In the present invention, as a result of the present inventors' steady investigation, the above-described problems were solved in a manner in which these components (a), (b) and (c) are used in combination and are present in the specified amount ratio, and the way to practical application was paved. Such is the case with other aspects of the present invention described below.

Another aspect of the present invention provides a solution for a solid electrolytic capacitor which is used for forming a solid electrolyte layer of a solid electrolytic capacitor, wherein the solution for a solid electrolytic capacitor has at least a conductive complex (a) of a cationized conductive polymer and a polymer anion, a first hydroxy compound (b) having four or more hydroxy groups, a second hydroxy compound (c) having an amino group and one or more hydroxy groups and a solvent.

Still another aspect of the present invention provides a method for producing a solid electrolytic capacitor including at least an anode body composed of a porous material, a dielectric layer formed on the surface of the anode body and a cathode body, wherein the method for producing a solid electrolytic capacitor has a step of forming a solid electrolyte layer in contact with a dielectric layer, which solid electrolyte layer includes at least a conductive complex (a) of a cationized conductive polymer and a polymer anion, a first hydroxy compound (b) having four or more hydroxy groups and a second hydroxy compound (c) having an amino group and one or more hydroxy groups.

Still another aspect of the present invention provides a solid electrolytic capacitor which is obtained by winding a porous anode body having a dielectric layer formed thereon and a cathode body together with separators having a solid electrolyte supported thereon, which separators are interposed between the anode body and the cathode body, wherein the solid electrolyte is formed by immersion in the solution for a capacitor.

Still another aspect of the present invention provides a method for producing a solid electrolytic capacitor which is obtained by winding a porous anode body having a dielectric layer formed thereon and a cathode body together with separators having a solid electrolyte supported thereon, which separators are interposed between the anode body and the cathode body, wherein the method for producing a solid electrolytic capacitor has a step of forming the solid electrolyte by immersion in the solution for a capacitor.

Advantageous Effects of Invention

A solid electrolytic capacitor of the present invention has low ESR, high heat resistance and excellent temperature stability.

A method for producing a solid electrolytic capacitor of the present invention can easily produce a capacitor with low ESR and excellent temperature stability.

The solution for a solid electrolytic capacitor of the present invention is suitable for producing a solid electrolytic capacitor with low ESR and excellent temperature stability, which solution for a solid electrolytic capacitor has low solution viscosity and excellent stability of solution viscosity.

DESCRIPTION OF EMBODIMENTS

[Solution for a Solid Electrolytic Capacitor]

The embodiments of the present invention will be now described by way of drawings. In the following description of the drawings, the drawings are merely schematic and the dimensions, ratios and the like in the drawings are different from the actual ones. It should be noted that decisions are made on the basis of explanations described below.

The embodiments described below provide examples of the constitutions and methods of the present invention in order to provide specific details of the technical ideas of the invention, and the embodiments of the present invention do not restrict the subject matter of the invention to the following. Various changes can be made to the embodiments of the present invention within the scope of claims.

An embodiment of the solution for a solid electrolytic capacitor of the present invention will be now described.

The solution for a solid electrolytic capacitor of the present invention is characterized by containing at least water and/or water and a mixed solvent, a conductive complex (a) of a cationized conductive polymer and a polymer anion, a first hydroxy compound (b) having four or more hydroxy groups and a second hydroxy compound (c) having an amino group and one or more hydroxy groups.

The solution for a solid electrolytic capacitor is used, in a solid electrolytic capacitor including an anode body composed of a porous material, a dielectric layer formed on the surface of the anode body and a cathode body, to form a solid electrolyte layer in contact with the dielectric layer.

[Conductive Complex]

The conductive complex refers to a substance which includes at least a cationized conductive polymer and a polymer anion and has conductivity. An anion dopant can be contained therein, if needed. It is not particularly restricted herein. The conductive complex can be easily obtained by chemical oxidation polymerization of a precursor monomer of a conductive polymer in the presence of an oxidizing agent or an oxidation polymerization catalyst, in the presence of a polymer anion dissolved or dispersed in a solvent.

(Conductive Polymer)

As the conductive polymer, any organic polymer in which its main chain is composed of a π conjugated system can be used. Examples thereof include polypyrroles, polythiophenes, polyacetylenes, polyphenylenes, polyphenylenevinylenes, polyanilines, polyacenes, polythiophenevinylenes and copolymers of these compounds. Polypyrroles, polythiophenes and polyanilines are preferred in terms of ease of polymerization and stability in air.

Although the conductive polymer can obtain adequate conductivity even in an unsubstituted form, it is preferred that functional groups such as an alkyl group, a carboxy group, a sulfo group, an alkoxy group, a hydroxy group and a cyano group be introduced into the conductive polymer to further increase the conductivity.

Specific examples of this type of conductive polymer include polypyrrole, poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), poly(3-methyl-4-hexyloxypyrrole), poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly (3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), poly(3-anilinesulfonic acid).

Among these, a (co)polymer which is composed of one or two or more compounds selected from polypyrrole, polythiophene, poly(N-methylpyrrole), poly(3-methylthiophene), poly(3-methoxythiophene) and poly(3,4-ethylenedioxythiophene) is suitably used in terms of values of resistance and reactivity. Further, polypyrrole and poly(3,4-ethylenedioxythiophene) are more preferred in term of higher conductivity and the improvement of heat resistance.

The above conductive polymer can be easily produced by chemical oxidation polymerization of a precursor monomer forming the conductive polymer in the presence of a proper oxidizing agent, oxidation catalyst and a polymer anion described below in a solvent.

(Precursor Monomer)

The precursor monomer is a compound which has a π conjugated system in its molecule and which, when polymerized by the action of a proper oxidizing agent, forms a π conjugated system on the main chain of a polymer. Examples thereof include pyrroles and derivatives thereof, thiophenes and derivatives thereof, anilines and derivatives thereof.

Specific examples of the precursor monomer include pyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxypyrrole, 3-methyl-4-carboxypyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole, 3-methyl-4-hexyloxypyrrole, thiophene, 3-methylthiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butenedioxythiophene, 3-methyl-4-methoxythiophene, 3-methyl-4-ethoxythiophene, 3-carboxythiophene, 3-methyl-4-carboxythiophene, 3-methyl-4-carboxyethylthiophene, 3-methyl-4-carboxybutylthiophene, aniline, 2-methylaniline, 3-isobutylaniline, 2-anilinesulfonic acid, 3-anilinesulfonic acid.

(Polymer Anion)

The polymer anion refers to a polymer having anion groups on the side chains of the polymer.

These anion groups can be functional groups which are capable of causing chemical oxidative doping of a conductive polymer. Among these, monosubstituted sulfate ester groups, monosubstituted phosphate ester groups, phosphoric acid groups, carboxy groups, sulfo groups and the like are preferred in terms of ease of production and stability. Further, sulfo groups, monosubstituted sulfate ester groups and carboxy groups are more preferred in terms of the doping effects of the functional groups on a conductive polymer.

The polymers are a substituted or unsubstituted polyalkylene, a substituted or unsubstituted polyalkenylene, a substituted or unsubstituted polyimide, a substituted or unsubstituted polyamide, a substituted or unsubstituted polyester and copolymers of these polymers, which polymers are composed of structural units having an anion group or polymers are composed of structural units having an anion group and structural units having no anion groups.

The anion groups of the polymer anions function as a dopant for a conductive polymer to improve the conductivity and heat resistance of the conductive polymer.

Specific examples of the polymer anions include polyvinylsulfonic acid, polystyrenesulfonic acid, polyallylsulfonic acid, polyacrylsulfonic acid, polymethacrylsulfonic acid, poly-2-acrylamido-2-methylpropanesulfonic acid, polyisoprenesulfonic acid, polyvinylcarboxylic acid, polystyrenecarboxylic acid, polyallylcarboxylic acid, polyacryl carboxylic acid, polymethacrylcarboxylic acid, poly-2-acrylamido-2-methylpropanecarboxylic acid, polyisoprenecarboxylic acid, polyacrylic acid. The polymer anion can be a homopolymer of the above polymers or a copolymer of two or more polymers.

Among these, polystyrenesulfonic acid, polyacrylsulfonic acid and polymethacrylsulfonic acid are preferred.

The degree of polymerization of a polymer anion is preferably in a range from 10 to 100,000 monomer units, and in terms of solvent solubility and conductivity, more preferably in a range from 50 to 10,000 monomer units.

Examples of methods for producing a polymer anion include methods in which an anion group is directly introduced into a polymer having no anion groups using an acid, methods in which a polymer having no anion groups is sulfonated using a sulfonating agent, and methods in which an anion group-containing polymerizable monomer is polymerized.

The methods for producing a polymer anion by polymerizing an anion group-containing polymerizable monomer include a method in which an anion group-containing polymerizable monomer is subjected to oxidative polymerization or radical polymerization in the presence of an oxidizing agent and/or a polymerization catalyst in a solvent. Specifically, the predetermined amount of an anion group-containing polymerizable monomer is dissolved in a solvent, and the obtained solution is maintained at a constant temperature. To the solution, a solution prepared in advance by solving the predetermined amount of an oxidizing agent and/or a polymerization catalyst in a solvent is added and allowed to react for a predetermined time. The polymer obtained in the reaction is adjusted to a constant concentration using a solvent. In this production method, a polymerizable monomer having no anion groups can be copolymerized with the anion group-containing polymerizable monomer.

The oxidizing agent, oxidation catalyst and solvent used for polymerization of the anion group-containing polymerizable monomer are the same as those for polymerization of a precursor monomer forming a conductive polymer. When the obtained polymer is a polymer anion salt, it is preferred that the salt be converted into a polymer anion acid. The methods for converting an anion salt into an anion acid include ion-exchange methods using an ion exchange resin, ultrafiltration methods and the like. Among these, ultrafiltration methods are preferred in terms of ease of operation.

An anion group-containing polymerizable monomer is a compound in which a portion of the monomer is substituted with a monosubstituted sulfate ester group, a carboxy group, a sulfo group and the like. Examples thereof include substituted or unsubstituted ethylenesulfonic acid compounds, substituted or unsubstituted styrenesulfonic acid compounds, substituted or unsubstituted acrylate sulfonic acid compounds, substituted or unsubstituted methacrylate sulfonic acid compounds, substituted or unsubstituted acrylamido sulfonic acid compounds, substituted or unsubstituted cyclovinylene sulfonic acid compounds, substituted or unsubstituted butadiene sulfonic acid compounds, substituted or unsubstituted vinyl aromatic sulfonic acid compounds.

Specific examples thereof include vinylsulfonic acid and salts thereof, allylsulfonic acid and salts thereof, methallylsulfonic acid and salts thereof, styrenesulfonic acid and salts thereof, methallyloxybenzenesulfonic acid and salts thereof, allyloxybenzenesulfonic acid and salts thereof, α-methylstyrenesulfonic acid and salts thereof, acrylamido-t-butylsulfonic acid and salts thereof, 2-acrylamido-2-methylpropanesulfonic acid and salts thereof, cyclobutene-3-sulfonic acid and salts thereof, isoprenesulfonic acid and salts thereof, 1,3-butadiene-1-sulfonic acid and salts thereof, 1-methyl-1, 3-butadiene-2-sulfonic acid and salts thereof, 1-methyl-1,3-butadiene-4-sulfonic acid and salts thereof, sulfoethyl acrylate ($CH_2CH-COO-(CH_2)_2-SO_3H$) and salts thereof, sulfopropyl acrylate ($CH_2CH-COO-(CH_2)_3-SO_3H$) and salts thereof, sulfo-t-butyl acrylate ($CH_2CH-COO-C(CH_3)_2CH_2-SO_3H$) and salts thereof, sulfo-n-butyl acrylate ($CH_2CH-COO-(CH_2)_4-SO_3H$) and salts thereof, sulfoethyl allylate ($CH_2CHCH_2-COO-(CH_2)_2-SO_3H$) and salts thereof, sulfo-t-butyl allylate ($CH_2CHCH_2-COO-C(CH_3)_2CH_2-SO_3H$) and salts thereof, sulfoethyl 4-pentenoate ($CH_2CH(CH_2)_2-COO-(CH_2)_2-SO_3H$) and salts thereof, sulfopropyl 4-pentenoate ($CH_2CH(CH_2)_2-COO-(CH_2)_3-SO_3H$) and salts thereof, sulfo-n-butyl 4-pentenoate ($CH_2CH(CH_2)_2-COO-(CH_2)_4-SO_3H$) and salts thereof, sulfo-t-butyl 4-pentenoate ($CH_2CH(CH_2)_2-COO-C(CH_3)_2CH_2-SO_3H$) and salts thereof, sulfophenylene 4-pentenoate ($CH_2CH(CH_2)_2-COO-C_6H_4-SO_3H$) and salts thereof, sulfonaphthalene 4-pentenoate ($CH_2CH(CH_2)_2-COO-C_{10}H_8-SO_3H$) and salts thereof, sulfoethyl methacrylate ($CH_2C(CH_3)-COO-(CH_2)_2-SO_3H$) and salts thereof, sulfopropyl methacrylate ($CH_2C(CH_3)-COO-(CH_2)_3-SO_3H$) and salts thereof, sulfo-t-butyl methacrylate ($CH_2C(CH_3)-COO-C(CH_3)_2CH_2-SO_3H$) and salts thereof, sulfo-n-butyl methacrylate ($CH_2C(CH_3)-COO-(CH_2)_4-SO_3H$) and salts thereof, sulfophenylene methacrylate ($CH_2C(CH_3)-COO-C_6H_4-SO_3H$) and salts thereof, sulfonaphthalene methacrylate ($CH_2C(CH_3)-COO-C_{10}H_8-SO_3H$) and salts thereof, polyvinylcarboxylic acid, polystyrenecarboxylic acid, polyallylcarboxylic acid, polyacrylcarboxylic acid, polymethacrylcarboxylic acid, poly-2-acrylamido-2-methylpropanecarboxylic acid, polyisoprenecarboxylic acid, polyacrylic acid. The polymer anions can be also copolymers containing two or more of the above compounds.

Examples of the polymerizable monomers having no anion groups include ethylene, propene, 1-butene, 2-butene, 1-pentene, 2-pentene, 1-hexene, 2-hexene, styrene, p-methylstyrene, p-ethylstyrene, p-butylstyrene, 2,4,6-trimethylstyrene, p-methoxystyrene, α-methylstyrene, 2-vinylnaphthalene, 6-methyl-2-vinylnaphthalene, 1-vinylimidazole, vinylpyridine, vinylacetate, acrylaldehyde, acrylnitrile, N-vinyl-2-pyrrolidone, N-vinylacetamide, N-vinylformamide, N-vinylimidazole, acrylamide, N-dimethylacrylamide, acrylic acid, methyl acrylate, ethyl acrylate, propyl acrylate, n-butyl acrylate, i-butyl acrylate, t-butyl acrylate, isooctyl acrylate, isononylbutyl acrylate, lauryl acrylate, allyl acrylate, stearyl acrylate, isobornyl acrylate, cyclohexyl acrylate, benzyl acrylate, ethylcarbitol acrylate, phenoxyethyl acrylate, hydroxyethyl acrylate, methoxyethyl acrylate, ethoxyethyl acrylate, methoxybutyl acrylate, methacrylic acid, methyl methacrylate, ethyl methacrylate, n-butyl methacrylate, i-butyl methacrylate, t-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, acryloylmorpholine, vinylamine, N,N-dimethylvinylamine, N,N-diethylvinylamine, N,N-dibutylvinylamine, N,N-di-t-butylvinylamine, N,N-diphenylvinylamine, N-vinylcarbazole, vinyl alcohol, vinyl chloride, vinyl fluoride, methyl vinyl ether, ethyl vinyl ether, cyclopropene, cyclobutene, cyclopentene, cyclohexene, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene, 2-hydroxy-1,3-butadiene.

By copolymerizing these polymerizable monomers having no anion groups, solvent solubility can be controlled.

If a conductive polymer can be stably dissolved or dispersed in a solvent, the amount of a polymer anion in a conductive complex is not particularly restricted and can be suitably used. The number of moles of anion groups in a polymer anion is preferably in a range from 1 to 5 times the number of moles of a conductive polymer. When the number of moles of anion groups is within the range, a conductive complex can have both high conductivity and stable dispersibility. When the number of moles of anion groups in a polymer anion is less than 1 time, dispersibility tends to worsen and the when the number of moles of anion groups in a polymer anion is greater than 5 times, conductivity tends to decline.

(Polymer Anion Salt)

An aqueous dispersed solution of a conductive complex containing a polymer anion and a conductive polymer is generally lower than pH 3 and thus is strong acidic and has low immersibility in capacitor elements. To improve the immersibility in the inside of its anode foil and its cathode foil, it is preferred that the degree of acidity be adjusted. The solution for a capacitor of the present embodiment can be suitably used in a range from pH 3 to 13. To improve the immersibility in the inside of its anode foil and its cathode foil, it is preferred that the degree of acidity be adjusted. The pH is more preferably in a range from pH 3 to 8.

In the case of pH 3 or less, even the initial characteristics of e.g. ESR and capacitance cannot be expressed. In the case of pH 8 or more, although the initial characteristics are not problematic, long term heat resistance is inferior. Further in the case of pH 13 or more, the characteristics are remarkably lowered by a short term heat resistance test.

By adding an alkaline compound to an aqueous solution in which the above conductive complex of a polymer anion and a conductive polymer is dissolved or dispersed, the pH of the aqueous solution can be easily adjusted. By adjusting the pH of the aqueous solution, the degree of acidity of the conductive complex can be easily changed and thus a salt of the polymer anion can be formed.

Adjustment of the degree of acidity can be suitably carried out using a pH adjuster, and for example alkalis, amines, imidazoles, pyridines and the like can be used as the pH adjusters.

Examples of the alkalis include sodium hydroxide, potassium hydroxide, calcium hydroxide, ammonia. Examples of the amines include aliphatic amines such as ethylamine, diethylamine, methylethylamine, triethylamine; aromatic amines such as aniline, benzylamine, pyrrole, imidazole, pyridine; or derivatives of the above compounds.

Among these, weakly basic aliphatic amines, imidazoles, pyridines and metal alkoxides are preferred.

An ammonium salt of a polymer anion can be formed using e.g. a primary amine (such as methylamine, ethylamine, propylamine, butylamine or ethylenediamine), a secondary amine (such as dimethylamine, diethylamine, dipropylamine, methylethylamine, diphenylamine or iminodiethanol), a tertiary amine (such as trimethylamine, triethylamine, tripropylamine or triphenylamine), or a tetraalkylammonium (tetramethylammonium, tetraethylammonium, tetrapropylammonium, tetrabutylammonium, methyltriethylammonium or dimethyldiethylammonium) as the aliphatic amine.

Specific examples of the imidazoles and derivatives thereof include imidazole, 2-methylimidazole, 2-propylimidazole, 2-undecylimidazole, 2-phenylimidazole, N-methylimidazole, 1-(2-hydroxyethyl)imidazole, 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole, 2-(2-pyridyl)benzimidazole.

Specific examples of the pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, 2,4-pyrimidinediol.

(Solvent)

The solvent used for producing a conductive polymer is not limited and any solvent which is capable of dissolving or dispersing the above precursor monomer and maintaining the oxidizing power of an oxidizing agent and an oxidation catalyst can be used. Examples thereof include polar solvents such as water, N-methyl-2-pyrrolidone, N,N-dimethylformamide, N,N-dimethylacetamide, dimethylsulfoxide, hexamethylenephosphortriamide, acetonitrile and benzonitrile; phenols such as cresol, phenol and xylenol; alcohols such as methanol, ethanol, propanol and butanol; ketones such as acetone and methylethylketone; hydrocarbons such as hexane, benzene and toluene; carboxylic acids such as formic acid and acetic acid; carbonate compounds such as ethylene carbonate and propylene carbonate; ether compounds such as dioxane and diethylether; chain ethers such as ethylene glycol dialkyl ethers, propylene glycol dialkyl ethers, polyethylene glycol dialkyl ethers and polypropylene glycol dialkyl ethers; heterocyclic compounds such as 3-methyl-2-oxazolidinone; nitrile compounds such as acetonitrile, glutarodinitrile, methoxyacetonitrile, propionitrile and benzonitrile. These solvents can be used individually, as mixtures of two or more of the above solvents, or as mixtures with other organic solvents.

(Oxidizing Agent and Oxidation Catalyst)

An oxidizing agent and an oxidation catalyst which can oxidize the above precursor monomer to obtain a conductive polymer can be used. Examples thereof include peroxodisulfates such as ammonium peroxodisulfate, sodium peroxodisulfate and potassium peroxodisulfate; transition metal compounds such as ferric chloride, ferric sulfate, ferric nitrate and cupric chloride; metal halide compounds such as boron trifluoride and aluminum chloride; metallic oxides such as silver oxide and cesium oxide; peroxides such as hydrogen peroxide and ozone; organic peroxides such as benzoyl peroxide; oxygen.

[First Hydroxy Compound]

The first hydroxy compound of the present embodiment refers to an aliphatic compound having four or more hydroxy groups in its molecule. Examples thereof include sugars, sugar alcohols, polyhydroxy compounds.

Specific examples thereof include sugars such as sucrose, maltose, xylose and cellulose and sugar derivatives; sugar alcohols such as D-glucitol, mannite, pentaerythritol and dipentaerythritol; polyvinylalcohol. A compound having a high melting point is preferred in terms of the thermal stability of a conductive polymer film. More preferred examples include pentaerythritol, dipentaerythritol which have a melting point of 170° C. or more.

The content of a first hydroxy compound is suitably 1 time or more a conductive complex in terms of the mass ratio. The content of a first hydroxy compound is preferably greater than the mass of a conductive complex. The content of a first hydroxy compound is further preferably 1 to 20 times. When the content of a first hydroxy compound is within the range, the heat resistance and conductivity of a solid electrolyte can be both obtained. When the content of a first hydroxy compound exceeds 20 times, the film forming properties of a solid electrolyte tend to worsen.

[Second Hydroxy Compound]

The second hydroxy compound of the present embodiment refers to a compound having one or more amino groups and one or more hydroxy groups in its molecule.

Because a second hydroxy compound contains an amino group in its molecule, the amino group and a portion of a conductive complex in a solid electrolyte easily form an ionic bond and thus the film forming properties of the solid electrolyte can be improved. Because a second hydroxy compound also contains a hydroxy group in its molecule, it is believed that the interactions of the second hydroxy compound with a first hydroxy compound and a third hydroxy compound in a solid electrolyte are easily produced.

A second hydroxy compound preferably has C1-C4 alkylene between an amino group and a hydroxy group, and preferably has one or more alkyl groups on the amino group. A second hydroxy compound preferably contains one or more compounds selected from ethylaminoethanol, diethylaminoethanol, methylaminoethanol and dimethylaminoethanol, and preferably contains nitrilotriethanol.

Specific examples thereof include aminomethanol, aminoethanol, 3-amino-1-propanol, 2-amino-2-methyl-1-propanol, ethylaminopropanol, 2-(2-aminoethoxy)ethanol, 2-amino-2-methyl-1,3-propanediol, 2-amino-1,3-propanediol, 3-amino-1,2-propanediol, 1-amino-2-butanol, 2-amino-1-butanol, 2-aminocyclohexanol, N-cyclohexylethanolamineN-(3-aminopropyl)diethanolamine, 2-(butylamino)ethanol, 2-(tert-butylamino)ethanol, N-(2-cyanoethyl)diethanolamine, 2-(2-diethylaminoethoxy)ethanol, 2-(ethylamino)ethanol, 2-(methylamino)ethanol, 2-diethylaminoethanol, 2-(dimethylamino)ethanol, diisopropanolamine, 2-(isopropylamino)ethanol, 3-(diethylamino)-1,2-propanediol, 2-[2-(dimethylamino)ethoxy]ethanol, 3-(dimethylamino)-1,2-propanediol, D-glucamine, N-methyl-D-glucamine, 1-(2-hydroxyethyl)pyrrolidine, 2-[(hydroxymethyl)amino]ethanol, iminodiethanol, N-ethyldiethanolamine, N-butyldiethanolamine, nitrilotriethanol. Preferred are aminoethanol, 2-(methylamino)ethanol, 2-diethylaminoethanol, 2-(dimethylamino)ethanol, 1-amino-2-butanol, 2-amino-1-butanol, nitrilotriethanol and the like in terms of the film forming properties and conductivity of a conductive polymer, and stability of a solution and the like.

The content of a second hydroxy compound is suitably 0.1 to 1.0 time a conductive complex in terms of the mass ratio. The content of a second hydroxy compound is preferably less than the mass of a conductive complex. The content of a second hydroxy compound is preferably in a range from 0.3 to 0.8 times. When the content of a second hydroxy compound is within the range, the film forming properties and conductivity of a solid electrolyte can be both obtained. When the content of a second hydroxy compound exceeds 1 time, the conductivity of a solid electrolyte tends to worsen.

[Third Hydroxy Compound]

The third hydroxy compound of the present embodiment refers to a compound having 1 to 3 hydroxy groups in its molecule. Examples thereof include reactive monomer compounds, glycol compounds. It is preferred that a third hydroxy compound be a (meth)acrylate or a (meth)acrylamide.

Examples of the reactive monomer compounds include 2-hydroxyethyl acrylate, 2-hydroxyethyl methacrylate (HEMA), 2-hydroxybutyl acrylate, 2-hydroxybutyl methacrylate, N-(hydroxymethyl)acrylamide, N-(hydroxymethyl)methacrylamide. Examples of the glycol compounds include diethylene glycol monoethyl ether (DEGEE).

The content of a third hydroxy compound is suitably 0.5 times or more a conductive complex in terms of the mass ratio. The content of a third hydroxy compound is preferably greater than the mass of a conductive complex. The content of a third hydroxy compound is further preferably in a range from 1 to 20 times. When the content of a third hydroxy compound is within the range, the heat resistance and conductivity of a solid electrolyte can be both obtained. When the content of a third hydroxy compound exceeds 20 times, the film forming properties of a solid electrolyte tend to worsen.

(Solvent)

As solvents of the solution for a solid electrolytic capacitor of the present invention, water and solvents which can be mixed with water can be suitably used. Examples thereof include polar solvents such as water, N-methyl-2-pyrrolidone, N,N-dimethylformamide, N,N-dimethylacetamide, dimethylsulfoxide, hexamethylenephosphortriamide, acetonitrile and benzonitrile; phenols such as cresol, phenol and xylenol; alcohols such as methanol, ethanol, propanol and butanol; ketones such as acetone and methylethylketone; hydrocarbons such as hexane, benzene and toluene; carboxylic acids such as formic acid and acetic acid; carbonate compounds such as ethylene carbonate and propylene carbonate; ether compounds such as dioxane and diethylether; chain ethers such as ethylene glycol dialkyl ethers, propylene glycol dialkyl ethers, polyethylene glycol dialkyl ethers and polypropylene glycol dialkyl ethers; heterocyclic compounds such as 3-methyl-2-oxazolidinone; nitrile compounds such as acetonitrile, glutarodinitrile, methoxyacetonitrile, propionitrile and benzonitrile.

(Particle Size)

The conductive complex of the present embodiment preferably has an average particle diameter of 1500 nano meter or less and more preferably 500 nano meter or less in view of immersibility in the inside of capacitor elements. When the average particle diameter is 1500 nano meter or more, large numbers of particles which are larger than the pores of a porous aluminum foil are contained and thus the immersibility in the inside of capacitor elements may worsen. Therefore, characteristics such as capacitance are difficult to obtain. Additionally, d50 is preferably 1000 nano meter or less, and more preferably 100 nano meter or less.

The particle diameters can be controlled by adjusting the degree of polymerization of a conductive polymer and the molecular weight of a polymer anion when synthesizing a conductive complex. In addition, the particle diameters can be controlled by e.g. a dispersing method after synthesizing a conductive complex and by adding a dispersing agent. As the dispersing methods, high pressure grinding and the like are mentioned.

(Solution Viscosity)

In the solution for a capacitor of the present embodiment, the concentration of the solid content in a conductive complex is preferably 0.5 to 3.0% by mass and more preferably 1.0 to 2.0% by mass. When the concentration of the solid content is 0.5% by mass or more, a solid electrolyte film can be easily formed. When the concentration of the solid content is 3.0% by mass or less, viscosity can be reduced and a solution for a capacitor can be easily permeated into the inside of a porous capacitor base 10a.

Because permeability increases, the viscosity of a solution is preferably 100 mPa·s or less, more preferably 50 mPa·s or less and particularly preferably 30 mPa·s or less.

Examples of methods for reducing the viscosity of a solution for a capacitor include methods which reduce the concentration of the solid content in a solution for a capacitor, methods which adjust the molecular weight of a polymer anion, methods which add a lower viscosity solvent component, methods which increase the dispersibility of a π conjugated system conductive polymer. One of these methods can be used individually or two or more methods can be applied in combination.

In the methods which adjust the molecular weight of a polymer anion, the mass average molecular weight of the polymer anion is preferably adjusted in a range from 100,000 to 1,000,000 and more preferably a range from 200,000 to 800,000. When the mass average molecular weight of a polymer anion is 100,000 or more and 1,000,000 or less, the viscosity of a solution for a capacitor can be reduced and thus a conductive polymer solution can be easily permeated into the inside of the porous capacitor base 10a.

Examples of the low viscosity solvent component in the methods which add a low viscosity solvent component include alcohol solvents such as methanol, ether solvents such as diethylether.

Examples of methods which increase the dispersibility of a solution for a capacitor include high pressure dispersion methods, ultrasonic dispersion methods, high speed fluid dispersion methods.

(Conductive Improver)

To further increase the conductivity of a solid electrolyte in the solid electrolytic capacitor of the present embodiment, a compound which is capable of increasing the conductivity of a conductive polymer can be added. As used herein, a conductive improver is a compound which interacts with a conductive polymer or a dopant of a conductive polymer to improve the electrical conductivity of the conductive polymer.

The compound is, for example, preferably one or more compounds selected from the group consisting of ether compounds, nitrogen-containing aromatic cyclic compounds, compounds having two or more hydroxy groups, compounds having two or more carboxy groups, compounds having one or more hydroxy groups and one or more carboxy groups, compounds having an amide group, compounds having an imide group, lactam compounds, compounds having a glycidyl group, acryl compounds.

Nitrogen-Containing Aromatic Cyclic Compounds

Examples of the nitrogen-containing aromatic cyclic compounds include pyridines and derivatives thereof, which contain a nitrogen atom, imidazoles and derivatives thereof, pyrimidines and derivatives thereof, and pyrazines and derivatives thereof, all of which contain two nitrogen atoms, triazines and derivatives thereof, which contain three nitrogen atoms. Pyrizines and derivatives thereof, imidazoles and derivatives thereof, and pyrimidines and derivatives thereof are preferred in terms of solubility in a solvent.

Additionally, in the nitrogen-containing aromatic cyclic compounds, substituents such as an alkyl group, a hydroxy group, a carboxy group, a cyano group, a phenyl group, a phenol group, an ester group, an alkoxyl group and a carbonyl group may be optionally introduced into their rings. The rings may be also polycyclic rings.

Specific examples of the pyridines and derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinemethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, 3-pyridinesulfonic acid.

Specific examples of the imidazoles and derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl)imidazole, 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole, 2-(2-pyridyl)benzimidazole.

Specific examples of the pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, 2,4-pyrimidinediol.

Specific examples of the pyrazines and derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2-ethyl-3-methylpyrazine, 2,3-dimethylpyrazine, 2,3-diethylpyrazine.

Specific examples of the triazines and derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridine-1,3,5-triazine, 3-(2-pyridine)-5,6-bis(4-phenylsulfonic acid)-1,2,4-triazine disodium salt, 3-(2-pyridine)-5,6-diphenyl-1,2,4-triazine, 3-(2-pyridine)-5,6-diphenyl-1,2,4-triazine-ρ,ρ'-disulfonic acid disodium salt, 2-hydroxy-4,6-dichloro-1,3,5-triazine.

Examples of substituents which are introduced into the nitrogen atom of a nitrogen-containing aromatic cyclic compound include a hydrogen atom, an alkyl group, a hydroxy group, a carboxy group, a cyano group, a phenyl group, a phenol group, an ester group, an alkoxyl group, a carbonyl group. As types of substituent, any of the substituents shown above can be introduced.

The content of a nitrogen-containing aromatic cyclic compound is preferably in a range from 0.1 to 100 mol per mol of anion group unit of a polymer anion, more preferably a range from 0.5 to 30 mol, and particularly preferably a range from 1 to 10 mol in terms of the conductivity of a conductive complex. When the content of a nitrogen-containing aromatic cyclic compound is less than 0.1 mol, conductivity may be insufficient. When a nitrogen-containing aromatic cyclic compound is contained in an amount of more than 100 mol, the content of a conjugated system conductive polymer decreases and after all sufficient conductivity is difficult to obtain.

Compounds Having Two or More Hydroxy Groups

Examples of the compounds having two or more hydroxy groups include polyhydric aliphatic alcohols such as propylene glycol, 1,3-butylene glycol, 1,4-butylene glycol, glycerol, diglycerol, isoprene glycol, dimethylolpropionic acid, butanediol, 1,5-pentanediol, 1,6-hexanediol, 1,9-nonanediol, neopentyl glycol, trimethylolethane, trimethylolpropane, thiodiethanol, tartaric acid, D-glucaric acid and glutaconic acid; aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenyl sulfone, 2,2',5,5'-tetrahydroxydiphenyl sulfone, 3,3',5,5'-tetramethyl-4,4' dihydroxydiphenyl sulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, 1,4-dihydroxy-2-naphthoic acid phenyl ester, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate, ethyl gallate, potassium hydroquinone sulfonate.

The content of a compound having two or more hydroxy groups is preferably in a range from 0.05 to 50 mol per mol of anion group unit of a polymer anion, and more preferably a range from 0.3 to 10 mol. When the content of a compound having two or more hydroxy groups is less than 0.05 mol per mol of anion group unit of a polymer anion, conductivity and heat resistance may be insufficient. When the content of a compound having two or more hydroxy groups is greater than 50 mol per mol of anion group unit of a polymer anion, the content of a conductive polymer in a solid electrolyte layer 13 decreases and after all sufficient conductivity is difficult to obtain and the properties of the solid electrolyte layer 13 may be changed.

Compounds Having Two or More Carboxy Groups

Examples of the compounds having two or more carboxy groups include aliphatic carboxylic acid compounds such as maleic acid, fumaric acid, itaconic acid, citraconic acid, malonic acid, 1,4-butanedicarboxylic acid, succinic acid, tartaric acid, adipic acid, D-glucaric acid, glutaconic acid and citric acid; aromatic carboxylic acid compounds wherein at least one or more carboxy groups are bonded to an aromatic ring such as phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic acid, biphenyltetracarboxylic dianhydride, benzophenone tetracarboxylic dianhydride, naphthalene dicarboxylic acid, trimellitic acid and pyromellitic acid; diglycolic acid, oxydibutyric acid, thiodiacetic acid, thiodibutyric acid, iminodiacetic acid, iminobutyric acid and the like.

The content of a compound having two or more carboxy groups is preferably in a range from 0.1 to 30 mol per mol of anion group unit of a polymer anion, and more preferably a range from 0.3 to 10 mol. When the content of a compound having two or more carboxy groups is less than 0.1 mol per mol of anion group unit of a polymer anion, conductivity and heat resistance may be insufficient. When the content of a compound having two or more carboxy groups is greater than 30 mol per mol of anion group unit of a polymer anion, the content of a conductive polymer in a solid electrolyte layer 13 decreases and after all sufficient conductivity is difficult to obtain and the properties of the solid electrolyte layer 13 may be changed.

Compounds Having One or More Hydroxy Groups and One or More Carboxy Groups

Examples of the compounds having one or more hydroxy groups and one or more carboxy groups include tartaric acid, glyceric acid, dimethylolbutanoic acid, dimethylolpropanoic acid, D-glucaric acid, glutaconic acid.

The content of a compound having one or more hydroxy groups and one or more carboxy groups is preferably 1 to 5,000 parts by mass per 100 parts by mass of a conductive complex, and more preferably 50 to 500 parts by mass. When the content of a compound having one or more hydroxy groups and one or more carboxy groups is less than 1 part by mass, conductivity and heat resistance may be insufficient. When the content of a compound having one or more hydroxy groups and one or more carboxy groups is greater than 5,000 parts by mass, the content of a conductive polymer in a solid electrolyte decreases and after all sufficient conductivity is difficult to obtain.

Amide Compounds

The compounds having an amide group are monomolecular compounds having an amide bond represented by —CO—NH— (wherein the CO portion is a double bond) in their molecules. That is, examples of the amide compounds include compounds having functional groups on both ends of the above bond, compounds in which a cyclic compound is bonded to a side of the above bond, urea in which functional groups on both ends of the above bond are hydrogen and urea derivatives.

Specific examples of the amide compounds include acetamide, malonamide, succinamide, benzamide, naphthamide, phthalamide, isophthalamide, terephthalamide, nicotinamide, isonicotinamide, 2-furamide, formamide, N-methylformamide, propionamide, propiolamide, butylamide, isobutylamide, palmitamide, stearylamide, oleamide, oxamide, glutaramide, adipamide, cinnamamide, glucolamide, lactamide, glyceramide, tartaramide, citramide, glyoxylamide, pyruvamide, acetoacetamide, dimethylacetamide, benzylamide, anthranilamide, ethylenediaminetetraacetamide, diacetamide, triacetamide, dibenzamide, tribenzamide, rhodanine, urea, 1-acetyl-2-thiourea, biuret, butylurea, dibutylurea, 1,3-dimethylurea, 1,3-diethylurea and derivatives of these compounds.

The molecular weight of an amide compound is preferably 46 to 10,000, more preferably 46 to 5,000, and particularly preferably 46 to 1,000.

The content of an amide compound is preferably 1 to 5,000 parts by mass, and more preferably 50 to 500 parts by mass per a total of 100 parts by mass of a conductive complex. When the content of an amide compound is less than 1 part by mass, conductivity and heat resistance may be insufficient. When the content of an amide compound is greater than 5,000 parts by mass, the content of a conductive polymer in a solid electrolyte decreases and after all sufficient conductivity is difficult to obtain.

Imide Compounds

The imide compounds are preferably monomolecular compounds having an imide bond (hereinafter referred to as imide compounds) because conductivity is further increased. Examples of the imide compounds include phthalimide and phthalimide derivatives, succinimide and succinimide derivatives, benzimide and benzimide derivatives, maleimide and maleimide derivatives, naphthalimide and naphthalimide derivatives on the basis of their skeletons.

Additionally, the imide compounds are classified into aliphatic imides, aromatic imides and the like on the basis of types of functional group on both ends, and aliphatic imides are preferred in terms of solubility.

Further, the aliphatic imide compounds are classified into saturated aliphatic imide compounds, which have an unsaturated bond between carbons in their molecules, and unsaturated aliphatic imide compounds, which have an unsaturated bond between carbons in their molecules.

The saturated aliphatic imide compounds are compounds represented by $R_1$—CO—NH—CO—$R_2$, wherein R1 and R2 are both saturated hydrocarbons. Specific examples thereof include cyclohexane-1,2-dicarboximide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoinacetic acid, N-hydroxy-5-norbornene-2,3-dicarboxyimide, glutarimide, semicarbazide, α,α-dimethyl-6-methylsuccinimide, bis[2-(succinimide oxycarbonyloxy)ethyl]sulfone, α-methyl-α-propylsuccinimide, cyclohexylimide.

The unsaturated aliphatic imide compounds are compounds represented by $R_1$—CO—NH—CO—$R_2$, wherein either R1 or R2, or both are one or more unsaturated bonds. Specific examples thereof include 1,3-dipropyleneurea, maleimide, N-methylmaleimide, N-ethylmaleimide, N-hydroxymaleimide, 1,4-bismaleimide butane, 1,6-bismaleimide hexane, 1,8-bismaleimide octane, N-carboxyheptylmaleimide.

The molecular weight of an imide compound is preferably 60 to 5,000, more preferably 70 to 1,000, and particularly preferably 80 to 500.

The content of an imide compound is preferably 10 to 10,000 parts by mass and more preferably 50 to 5,000 parts by mass per 100 parts by mass of a conductive complex. When the amount of an imide compound to be added is less than the lower limit of the above range, the effect of adding an imide compound decreases, which is not preferred. When the amount of an imide compound to be added exceeds the upper limit of the above range, a reduction in conductivity resulting from a reduction in the concentration of a conductive polymer occurs, which is not preferred.

Lactam Compounds

The lactam compounds are intramolecular cyclic amides of aminocarboxylic acids, wherein a portion of the ring is —CO—NR— (wherein R is hydrogen or any substituent). One or more carbon atoms in the ring can be unsaturated or substituted with a hetero atom.

Examples of the lactam compounds include pentano-4-lactam, 4-pentanelactam-5-methyl-2-pyrrolidone, 5-methyl-2-pyrrolidinone, hexano-6-lactam, 6-hexanelactam.

Compounds Having a Glycidyl Group

Examples of the compounds having a glycidyl group include glycidyl compounds such as ethyl glycidyl ether, butyl glycidyl ether, t-butyl glycidyl ether, allyl glycidyl ether, benzyl glycidyl ether, glycidyl phenyl ether, bisphenol A, diglycidyl ether, glycidyl ether acrylate and glycidyl ether methacrylate.

Organic Solvents

In addition, when some organic solvents remain in solid electrolytes, the solvents function as conductive improvers. Examples of the organic solvents which can be conductive improvers include polar solvents such as N-methyl-2-pyrrolidone, N,N-dimethylformamide, N,N-dimethylacetamide, dimethylsulfoxide, hexamethylenephosphortriamide, N-vinylpyrrolidone, N-vinylformamide and N-vinylacetamide; phenols such as cresol, phenol and xylenol; polyhydric aliphatic alcohols such as ethylene glycol, diethylene glycol, triethylene glycol, propylene glycol, dipropylene glycol, 1,3-butylene glycol, 1,4-butylene glycol, glycerol, diglycerol, isoprene glycol, butanediol, 1,5-pentanediol, 1,6-hexanediol, 1,9-nonanediol and neopentyl glycol; carbonate compounds such as ethylene carbonate and propylene carbonate; ether compounds such as dioxane and diethylether; chain ethers such as dialkyl ethers, propylene glycol dialkyl ethers, polyethylene glycol dialkyl ethers and polypropylene glycol dialkyl ethers; heterocyclic compounds such as 3-methyl-2-oxazolidinone; nitrile compounds such as acetonitrile, glutarodinitrile, methoxyacetonitrile, propionitrile and benzonitrile. These solvents can be used individually or used as a mixture of two or more solvents.

[Ether Compounds]

As the ether compounds, compounds having an ether group can be suitably used.

Specific examples thereof include diethylene glycol, triethylene glycol, oligo polyethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, polyether, glycidyl ethers, polyethylene glycol glycidyl ethers, polyethylene oxide, triethylene glycol monobutyl ether, triethylene glycol monoethyl ether, triethylene glycol monomethyl ether, tetraethylene glycol monobutyl ether, triethylene glycol-dimethyl ether, tetraethylene glycol-dimethyl ether, diethylene glycol-dimethyl ether, diethylene glycol-diethyl ether-diethylene glycol-dibutyl ether, dipropylene glycol, tripropylene glycol, polypropylene glycol, polypropylene dioxide, polyoxyethylene alkyl ethers, polyoxyethylene glycerol fatty acid esters, polyoxyethylene fatty acid amides.

The content of an ether compound is preferably 1 to 10,000 parts by mass and more preferably 50 to 1,500 parts by mass per 100 parts by mass of a conductive complex of a conductive polymer and a polymer anion. When the content of an ether compound is less than 1 part by mass, the conductivity of a conductive complex may not increase. When the content of an ether compound exceeds 10,000 parts by mass, the stability of a solution for a capacitor tends to decrease.

(Monomer Anion)

Conductivity may be increased by incorporating a monomer anion into the conductive complex of the present embodiment. If needed, the monomer anion can be introduced. The methods for introducing a monomer anion are not limited, and a monomer anion can be added when a conductive complex is synthesized from a precursor monomer of a conductive polymer and a polymer anion, and after a conductive complex is synthesized from a precursor monomer of a conductive polymer and a polymer anion, a monomer anion can be added to a dispersion solution of the conductive complex. Examples of the monomer anions include organic carboxylic acids, organic sulfonic acids, inorganic acids.

As organic carboxylic acids, aliphatic, aromatic, cyclic aliphatic compounds and the like containing one or two or more carboxy groups can be used. Examples thereof include formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitroacetic acid, triphenylacetic acid.

As organic sulfonic acids, aliphatic, aromatic, cyclic aliphatic compounds and the like containing one or two or more sulfo groups, or polymers containing a sulfo group can be used.

Examples of the compounds containing one sulfo group include methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, 1-tetradecanesulfonic acid, 1-pentadecanesulfonic acid, 2-bromoethanesulfonic acid, 3-chloro-2-hydroxypropanesulfonic acid, trifluoromethanesulfonic acid, trifluoroethanesulfonic acid, colistinmethanesulfonic acid, 2-acrylamido-2-methylpropanesulfonic acid, aminomethanesulfonic acid, 1-amino-2-naphthol-4-sulfonic acid, 2-amino-5-naphthol-7-sulfonic acid, 3-aminopropanesulfonic acid, N-cyclohexyl-3-aminopropanesulfonic acid, benzenesulfonic acid, alkylbenzenesulfonic acid, p-toluenesulfonic acid, xylenesulfonic acid, ethylbenzenesulfonic acid, propylbenzenesulfonic acid, butylbenzenesulfonic acid, pentylbenzenesulfonic acid, hexylbenzensulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, hexadecylbenzenesulfonic acid, 2,4-dimethylbenzenesulfonic acid, dipropylbenzenesulfonic acid, 4-aminobenzenesulfonic acid, o-aminobenzenesulfonic acid, m-aminobenzenesulfonic acid, 4-amino-2-chlorotoluene-5-sulfonic acid, 4-amino-3-methylbenzene-1-sulfonic acid, 4-amino-5-methoxy-2-methylbenzenesulfonic acid, 2-amino-5-methylbenzene-1-sulfonic acid, 4-amino-2-methylbenzene-1-sulfonic acid, 5-amino-2-methylbenzene-1-sulfonic acid, 4-amino-3-methylbenzene-1-sulfonic acid, 4-acetamido-3-chlorobenzenesulfonic acid, 4-chloro-3-nitrobenzenesulfonic acid, p-chlorobenzenesulfonic acid, naphthalenesulfonic acid, methylnaphthalenesulfonic acid, propylnaphthalenesulfonic acid, butylnaphthalenesulfonic acid, pentylnaphthalenesulfonic acid, 4-amino-1-naphthalenesulfonic acid, 8-chloronaphthalene-1-sulfonic acid, naphthalenesulfonic acid formaldehyde polycondensate, melaminesulfonic acid formaldehyde polycondensate, anthraquinonesulfonic acid, pyrenesulfonic acid. Metal salts of these compounds can be also used.

Examples of the compounds containing two or more sulfo groups include ethanedisulfonic acid, butanedisulfonic acid, pentanedisulfonic acid, decanedisulfonic acid, o-benzenedisulfonic acid, m-benzenedisulfonic acid, p-benzenedisulfonic acid, toluenedisulfonic acid, xylenedisulfonic acid, chlorobenzenedisulfonic acid, fluorobenzenedisulfonic acid, dimethylbenzenedisulfonic acid, diethylbenzenedisulfonic acid, aniline-2,4-disulfonic acid, aniline-2,5-disulfonic acid, 3,4-dihydroxy-1,3-benzenedisulfonic acid, naphthalenedisulfonic acid, methylnaphthalenedisulfonic acid, ethylnaphthalenedisulfonic acid, pentadecylnaphthalenedisulfonic acid, 3-amino-5-hydroxy-2,7-naphthalenedisulfonic acid, 1-acetamido-8-hydroxy-3,6-naphthalenedisulfonic acid, 2-amino-1,4-benzenedisulfonic acid, 1-amino-3,8-naphthalenedisulfonic acid, 3-amino-1,5-naphthalenedisulfonic acid, 8-amino-1-naphthol-3,6-disulfonic acid, 4-amino-5-naphthol-2,7-disulfonic acid, 4-acetamido-4'-isothio-cyanotostilbene-2,2'-disulfonic acid, 4-acetamido-4'-isothiocyanatostilbene-2,2'-disulfonic acid, 4-acetamido-4'-maleimidylstilbene-2,2'-disulfonic acid, naphthalenetrisulfonic acid, dinaphthylmethanedisulfonic acid, anthraquinonedisulfonic acid, anthracenesulfonic acid. Metal salts of these compounds can be also used.

(Binder Resin)

To adjust the film forming properties of a conductive complex, binder resins can be added to a solid electrolyte of the capacitor of the present embodiment. Examples thereof include polyesters, polyurethanes, acryl resins, epoxy resins, polyamides, polyacrylamides, silane coupling agents.

[Solid Electrolytic Capacitor]

Figure 1:
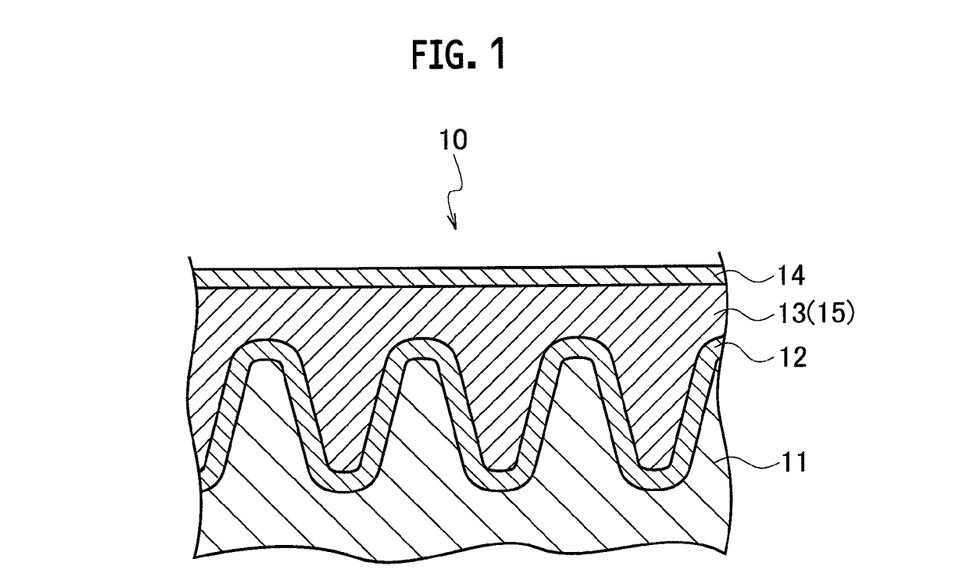
FIG. 1 is a sectional view showing an embodiment of a solid electrolytic capacitor.

The solid electrolytic capacitor of the present embodiment will be now described by reference to FIG. 1.

The solid electrolytic capacitor of the present embodiment roughly includes the anode foil 11 as an anode body composed of a porous material of a valve metal, a dielectric layer 12 farmed by oxidation of the surface of the anode 11, a cathode foil 14 as a cathode body, a separator 15 interposed between the anode foil 11 and the cathode foil 14, and the solid electrolyte layer 13 composed of the solid electrolyte supported on the separator.

<Anode>

Examples of the valve metals forming the anode foil 11 include aluminum, tantalum, niobium, titanium, hafnium, zirconium, zinc, tungsten, bismuth, antimony. Among these, aluminum, tantalum and niobium are preferred.

Specific examples of the anode foil 11 include anode foils obtained by etching an aluminum foil to increase its surface area and then carrying out an oxidation treatment of the surface, and anode foils obtained by carrying out an oxidation treatment of the surface of a sintered body of tantalum particles or niobium particles and forming a pellet. The anode foils thus treated have unevenness on the surfaces thereof.

<Dielectric Layer>

The dielectric layer 12 is formed, for example, by anodic oxidation of the surface of the anode foil 11 in an electrolytic solution such as an aqueous solution of ammonium adipate. Accordingly, as shown in FIG. 1, unevenness is also formed on the surface of the dielectric layer 12 in the same manner as of the anode foil 11.

<Cathode>

The cathode includes the solid electrolyte layer 13 supported by the separator 15 and the cathode foil 14 such as an aluminum foil formed on the solid electrolyte layer 13.

<Separator>

As the separator 15 used for the solid electrolytic capacitor of the present embodiment, well-known natural fibers and artificial fibers can be suitably used. The separator 15 is not limited herein.

(Solid Electrolyte Layer)

The solid electrolyte of the present embodiment includes at least a conductive complex (a) of a cationized conductive polymer and a polymer anion, a first hydroxy compound (b) having four or more hydroxy groups, and a second hydroxy compound (c) having an amino group and one or more hydroxy groups, the solid electrolyte being characterized by being located between the anode body and the cathode body and formed in contact with the anode body.

The solid electrolyte of the present embodiment can be formed using the above solution for a solid electrolytic capacitor. The solid electrolyte can be formed by a forming method such as a coating method, a printing method, or a dipping method. The solid electrolyte of the present embodiment is substantially fixed by crosslinking or solidification.

(Water)

The solid electrolyte of the present embodiment contains water. When a solid electrolyte is formed by a conventional in-situ polymerization method, as described in Patent Document 6, water is required to be removed as much as possible. On the contrary, because the solid electrolyte in the capacitor of the present embodiment contains the predetermined amount of water, the function of the capacitor is remarkably improved. That is, the suitable amount of water exists in the capacitor of the present embodiment, and thus capacitance is improved and ESR can be reduced. It is surmised that this is related to that the solid electrolyte of the present embodiment contains a large amount of a polymer anion such as polystyrenesulfonic acid. When the content of water is 7% by mass or less, a solid electrolyte can be suitably used, preferably 5% by mass or less, and more preferably 4% by mass or less. When the content of water is greater than 7% by mass, the film quality of a solid electrolyte tends to weaken, the high temperature heat resistance of a solid electrolytic capacitor worsens and capacitance and ESR are easily deteriorated by long term endurance. When water is 0.1% by mass or less, a reduction in the capacitance is observed. In the present invention, when the water amount is in a range from 0.1 to 7% by mass, capacitance and ESR can be both obtained. Further, excellent long term durability can be expressed by adjusting to a water amount of 4% by mass or less.

Adjustment of the water amount in a solid electrolyte can be controlled under dry conditions, in a dry atmosphere or the like, for example, can be controlled under the dry temperature which is set in a range from 100 to 300° C. Additionally, the content of water can be suitably adjusted in a reduced pressure atmosphere.

<Electrolytic Solution>

In the solid electrolytic capacitor of the present embodiment, after a solid electrolyte layer is formed, if needed, the layer is immersed in an electrolytic solution, and thus higher capacitance can be obtained by using the electrolytic solution. If an electrolytic solution has high conductivity, it is not limited. The electrolytic solution is a solution in which a well-known electrolyte is dissolved in a well-known solvent.

Examples of the solvents used for the electrolytic solution include alcohol solvents such as ethylene glycol, diethylene glycol, propylene glycol, 1,4-butanediol and glycerol, lactone solvents such as γ-butyrolactone, γ-valerolactone and δ-valerolactone; amide solvents such as N-methylformamide, N,N-dimethylformamide, N-methylacetamide and N-methylpyrrolidinone; nitrile solvents such as acetonitrile and 3-methoxypropionitrile; water.

Examples of the electrolyte include those including an organic acid such as adipic acid, glutaric acid, succinic acid, benzoic acid, isophthalic acid, phthalic acid, terephthalic acid, maleic acid, toluic acid, enanthic acid, malonic acid, formic acid, a decanedicarboxylic acid such as 1,6-decanedicarboxylic acid or 5,6-decanedicarboxylic acid, an octanedicarboxylic acid such as 1,7-octanedicarboxylic acid, azelaic acid or sebacic acid, or an inorganic acid such as boric acid, a boric acid-polyhydric alcohol complex compound obtained from boric acid and a polyhydric alcohol, phosphoric acid, carbonic acid or silicic acid as an anion component, and a primary amine (such as methylamine, ethylamine, propylamine, butylamine or ethylenediamine), a secondary amine (such as dimethylamine, diethylamine, dipropylamine, methylethylamine or diphenylamine), a tertiary amine (such as trimethylamine, triethylamine, tripropylamine, triphenylamine or 1,8-diazabicyclo(5,4,0)-undecene-7), a tetraalkylammonium (such as tetramethylammonium, tetraethylammonium, tetrapropylammonium, tetrabutylammonium, methyltriethylammonium or dimethyldiethylammonium) as a cation component.

[Method for Producing Solid Electrolytic Capacitor]

Figure 2:
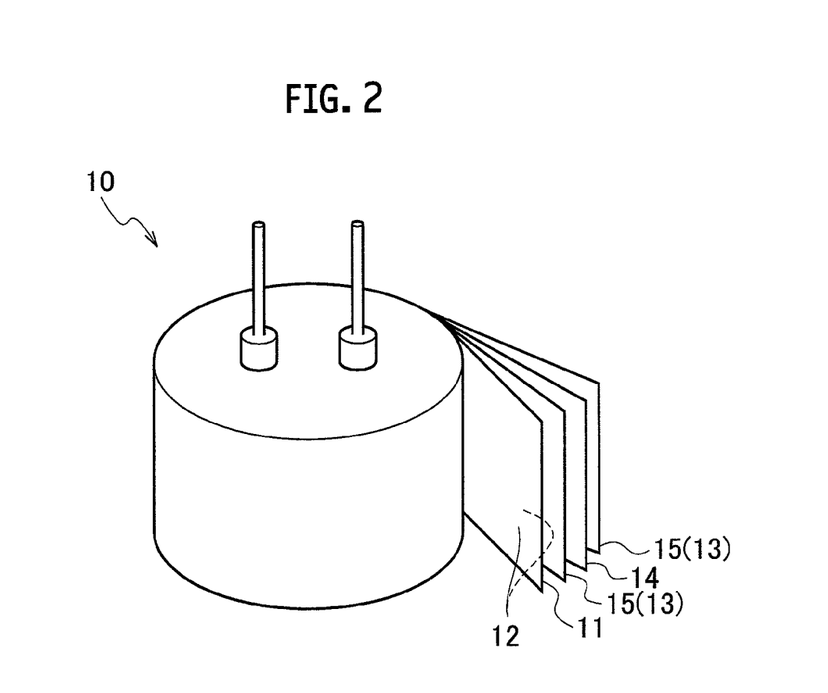
FIG. 2 is an oblique view showing another embodiment of a solid electrolytic capacitor.

The method for producing a solid electrolytic capacitor will be now described by reference to FIG. 2.

In the present embodiment, in a solid electrolytic capacitor 10 obtained by winding the porous anode foil 11 having a dielectric layer formed thereon and the cathode foil 14 together with the separators 15 having the solid electrolyte 13 supported thereon, which separators are interposed between the foils, the solid electrolyte layer 13 is formed by immersing in or applying a solution for a solid electrolytic capacitor, followed by drying. Examples of the application methods for the solution for a solid electrolytic capacitor include known techniques such as coating, dipping and spraying. Examples of the drying methods include known techniques such as a hot air drying.

EXAMPLES (1) Preparation of Conductive Polymer Solutions

Preparation Example 1

Preparation of a Conductive Polymer Solution (MB I)

In a solution obtained by dissolving 42.6 g of polystyrenesulfonic acid (mass average molecular weight; approximately 300,000) in 2,000 ml of ion exchanged water, 14.2 g of 3,4-ethylenedioxythiophene was mixed at 20° C.

The mixed solution thus obtained was maintained at 20° C., and 29.64 g of ammonium persulfate dissolved in 200 ml of ion exchanged water and an oxidation catalyst solution containing 8.0 g of ferric sulfate were added thereto while stirring. The obtained mixture was allowed to react for 15 hours with stirring.

The obtained reaction liquid was dialyzed to remove impure ions, and was then subjected to ion exchange to obtain a solution containing a conductive complex of approximately 1.6% by mass of polystyrenesulfonic acid and poly(3,4-ethylenedioxythiophene) (hereinafter referred to as PEDOT-PPS solution).

To 100 g of the PEDOT-PSS solution, 6.4 g of pentaerythritol and 6.4 g of diethylene glycol monoethyl ether (DEGEE) were added and dispersed to obtain a conductive polymer solution (MB I).

Preparation Example 2

Conductive Polymer Solution (MB II)

In 100 g of the PEDOT-PSS solution in Preparation Example 1, 4.8 g of pentaerythritol and 4.8 g of hydroxyethyl methacrylate (HEMA) were mixed and dispersed to obtain a conductive polymer solution (MB II).

Preparation Example 3

Conductive Polymer Solution (MB III)

In 100 g of the PEDOT-PSS solution in Preparation Example 1, 0.35 g of methylaminoethanol, 4.8 g of pentaerythritol and 4.8 g of hydroxyethyl methacrylate were mixed and dispersed to obtain a conductive polymer solution (MB III).

Preparation Example 4

Conductive Polymer Solution (MB IV)

In 100 g of the PEDOT-PSS solution in Preparation Example 1, 0.35 g of methylaminoethanol and 4.8 g of hydroxyethyl methacrylate were mixed and dispersed to obtain a conductive polymer solution (MB IV).

Preparation Example 5

Conductive Polymer Solution (MB V)

In 100 g of the PEDOT-PSS solution in Preparation Example 1, 1.75 g of methylaminoethanol and 1.5 g of pentaerythritol were mixed and dispersed to obtain a conductive polymer solution (MB V).

(2) Production of Solid Electrolytic Capacitors

An etched aluminum foil (anode foil) was connected to an anode lead terminal, and was then subjected to chemical conversion (an oxidation treatment) by applying a voltage of 102 V in a 10% by mass aqueous solution of diammonium adipate. The obtained etched aluminum foil (anode foil) and an aluminum cathode foil were wound through cellulose separators into a cylinder shape to obtain a capacitor element.

Example 1

To the conductive polymer solution (MB I) prepared in Preparation Example 1, 0.28 g of aminoethanol, 0.35 g of methylaminoethanol, 0.42 g of dimethylaminoethanol and 0.42 g ethylaminoethanol were separately added to obtain each conductive polymer solution.

A capacitor element was immersed in the obtained conductive polymer solution under a reduced pressure, and then dried at 150° C. for 30 minutes by a hot-air dryer. Further, immersion in each conductive polymer solution was repeated twice to form a solid electrolyte layer between a dielectric layer and a cathode.

Next, the capacitor element having the solid electrolyte layer formed was inserted into an aluminum case, and the case was sealed with sealing rubber.

Next, a direct current voltage of 70 V was applied between the anode and the cathode in an atmosphere of 150° C. for 60 minutes to obtain a solid electrolytic capacitor.

The initial values of the capacitance at 120 Hz and the ESR at 100 kHz of the produced capacitor were measured using LCR meter 2345 (manufactured by NF Corporation). These results are shown in Table 1. Additionally, the ESR is an index of impedance.

A direct current voltage of 50 V was applied between the anode and the cathode in an atmosphere of 150° C. for 500 hours to measure the ESR evaluated at high temperature of the solid electrolytic capacitor and heat resistance was evaluated. The results are shown in Table 1.

TABLE 1

|  | Additives | pH | Capacitance (μF) | ESR (mΩ) | ESR evaluated at high temperature (mΩ) |
|---|---|---|---|---|---|
| Example 1 | Aminoethanol | 3.1 | 46 | 18 | 20 |
|  | Methylaminoethanol | 3.1 | 47 | 15 | 15 |
|  | Dimethylaminoethanol | 3.1 | 48 | 13 | 13 |
|  | Ethylaminoethanol | 3.1 | 46 | 14 | 15 |
| Comparative Example 1 | Diethylamine | 3.2 | 43 | 35 | 47 |

Comparative Example 1

In the same manner as in Example 1, 0.47 g of diethylamine was added to the conductive polymer solution (MB I) to produce a solid electrolytic capacitor of Comparative Example 1. The evaluation results obtained by using the same evaluation method as in Example 1 are shown in Table 1.

Example 2

To the conductive polymer solution (MB II) prepared in Preparation Example 2, 0.42 g of aminoethanol, 0.52 g of methylaminoethanol, 0.63 g of dimethylaminoethanol, 0.63 g ethylaminoethanol, 0.63 g of aminopropanol, 1.0 g of iminodiethanol and 1.4 g of nitrilotriethanol were separately added to obtain each conductive polymer solution.

Each solid electrolytic capacitor was produced in the same manner as in Example 1. The evaluation results obtained by using the same evaluation method as in Example 1 are shown in Table 2.

TABLE 2

|  | Additives | pH | Capacitance (μF) | ESR (mΩ) | ESR evaluated at high temperature (mΩ) |
|---|---|---|---|---|---|
| Example 2 | Aminoethanol | 5.5 | 46 | 17 | 20 |
|  | Methylaminoethanol | 5.5 | 46 | 14 | 14 |
|  | Dimethylaminoethanol | 5.5 | 48 | 12 | 13 |
|  | Ethylaminoethanol | 5.5 | 45 | 14 | 15 |
|  | Aminopropanol | 5.5 | 44 | 18 | 21 |
|  | Iminodiethanol | 5.5 | 44 | 17 | 22 |
|  | Nitrilotriethanol | 5.5 | 45 | 15 | 17 |
| Comparative Example 2 | Ammonia | 5.3 | 43 | 24 | 29 |
| Comparative Example 3 | Imidazole | 7.8 | 43 | 20 | 28 |

Comparative Examples 2 and 3

In the same manner as in Example 1, 0.08 g of ammonia (Comparative Example 2) and 0.48 g of imidazole (Comparative Example 3) were separately added to the conductive polymer solution (MB I) to produce solid electrolytic capacitors of Comparative Example 2 and Comparative Example 3, respectively. The evaluation results obtained by using the same evaluation method as in Example 1 are shown in Table 1.

Example 3

To the conductive polymer solution (MB III) prepared in Preparation Example 3, 0.8 g of a silane coupling agent (KBM-403) and 0.8 g of polyester were separately added to obtain each conductive polymer solution.

Each solid electrolytic capacitor was produced in the same manner as in Example 1. The evaluation results obtained by using the same evaluation method as in Example 1 are shown in Table 3.

TABLE 3

|  | Additives | pH | Capacitance (μF) | ESR (mΩ) | ESR evaluated at high temperature (mΩ) |
|---|---|---|---|---|---|
| Example 3 | Silane coupling agent | 3.1 | 46 | 17 | 20 |
|  | Polyester | 3.1 | 46 | 14 | 14 |
| Comparative Example 4 | Methylaminoethanol | 3.1 | 39 | 35 | 60 |
| Comparative Example 5 | Methylaminoethanol | 12 | 35 | 150 | 300 |

Comparative Example 4

A solid electrolytic capacitor of Comparative Example 4 was produced using the conductive polymer solution (MB IV) in the same manner as in Example 1. The evaluation results obtained by using the same evaluation method as in Example 1 are shown in Table 3.

Comparative Example 5

A solid electrolytic capacitor of Comparative Example 5 was produced using the conductive polymer solution (MB V) in the same manner as in Example 1. The evaluation results obtained by using the same evaluation method as in Example 1 are shown in Table 3.

In Examples 1 to 3, the content of a conductive complex (a) is less than that of a first hydroxy compound (b), and greater than that of a second hydroxy compound (c) in terms of the mass ratio. According to the values of ESR and ESR evaluated at high temperature, ESR was low and temperature stability was high. On the contrary, in Comparative Examples 1 to 5 which did not meet conditions as above, ESR was high and temperature stability was low.

Other Embodiment

As described above, the present invention was described by way of embodiments and Examples thereof. The statements and drawings forming a portion of this disclosure are exemplary only, and it should not be understood that the present invention is restricted thereto. A variety of alternate embodiments, examples and techniques will be apparent to those of skilled in the art on the basis of the disclosure.

Thus, the present invention contains various embodiments and the like which are not described herein.

INDUSTRIAL APPLICABILITY

The invention of the solid electrolytic capacitor of the present application can be utilized for various electronic devices including digital devices. The method for producing the solution for a solid electrolytic capacitor and the solid electrolytic capacitor of the present application can be utilized for solid electrolytic capacitors which are suitable for various electronic devices including digital devices.

| List of Symbols | |
|---|---|
| 10 | capacitor |
| 11 | anode foil |
| 12 | dielectric layer |
| 13 | solid electrolyte layer |
| 14 | cathode foil |
| 15 | separator |

The invention claimed is:

1. A solid electrolytic capacitor comprising a dielectric layer and a solid electrolyte layer between a porous anode body and a cathode body,
    the solid electrolyte layer comprising at least
    (1) a conductive complex (a) of a cationized conductive polymer and a polymer anion,
    (2) a first hydroxy compound (b) having four or more hydroxy groups, and
    (3) a second hydroxy compound (c) having an amino group and one or more hydroxy groups,
    wherein the content of the conductive complex (a) is less than that of the first hydroxy compound (b) and greater than that of the second hydroxy compound (c) in terms of the mass ratio.

2. The solid electrolytic capacitor according to claim 1, wherein the second hydroxy compound (c) has C1-C4 alkylene between an amino group and a hydroxy group.

3. The solid electrolytic capacitor according to claim 1, wherein the second hydroxy compound (c) has one or more alkyl groups on the amino group.

4. The solid electrolytic capacitor according to claim 1, wherein the second hydroxy compound (c) comprises one or more compounds selected from ethylaminoethanol, diethylaminoethanol, methylaminoethanol and dimethylaminoethanol.

5. The solid electrolytic capacitor according to claim 1, wherein the second hydroxy compound (c) is nitrilotriethanol.

6. The solid electrolytic capacitor according to claim 1, wherein the first hydroxy compound (b) is pentaerythritol.

7. The solid electrolytic capacitor according to claim 1, wherein the solid electrolyte layer further comprises a third hydroxy compound (d) having one to three hydroxy groups.

8. The solid electrolytic capacitor according to claim 7, wherein the third hydroxy compound (d) is a (meth)acrylate or a (meth)acrylamide.

9. The solid electrolytic capacitor according to claim 7, wherein the content of the third hydroxy compound (d) is greater than the mass of the conductive complex (a).

10. The solid electrolytic capacitor according to claim 7, wherein the content of the third hydroxy compound (d) is 0.5 times or more the conductive complex (a) in terms of the mass ratio.

11. The solid electrolytic capacitor according to claim 7, wherein the content of the third hydroxy compound (d) is 1 to 20 times the conductive complex (a) in terms of the mass ratio.

12. The solid electrolytic capacitor according to claim 1, wherein the solid electrolyte layer comprises one or more compounds selected from ether compounds, compounds having an amide group, compounds having an imide group, lactam compounds, compounds having a glycidyl group, polyesters, polyurethanes, epoxy resins, polyamides and silane coupling agents.

13. The solid electrolytic capacitor according to claim 1, wherein the solid electrolyte layer is substantially fixed by crosslinking or solidification.

14. The solid electrolytic capacitor according to claim 1, wherein to the solid electrolyte layer, an electrolytic solution is further added.

15. The solid electrolytic capacitor according to claim 1, wherein the content of the first hydroxy compound (b) is greater than the mass of the conductive complex (a), and is at most 20 times the conductive complex (a) in terms of the mass ratio.

16. The solid electrolytic capacitor according to claim 1, wherein the content of the second hydroxy compound (c) is less than the mass of the conductive complex (a), and is at least 0.1 times the conductive complex (a) in terms of the mass ratio.

17. The solid electrolytic capacitor according to claim 16, wherein the content of the second hydroxy compound (c) is 0.3 to 0.8 times the conductive complex (a) in terms of the mass ratio.

18. A solution for a solid electrolytic capacitor, which is used for forming a solid electrolyte layer of a solid electrolytic capacitor,
the solution for a solid electrolytic capacitor comprising at least
(1) a conductive complex (a) of a cationized conductive polymer and a polymer anion,
(2) a first hydroxy compound (b) having four or more hydroxy groups,
(3) a second hydroxy compound (c) having an amino group and one or more hydroxy groups, and
(4) a solvent (e),
wherein the content of the conductive complex (a) is 1 to 2% by mass, is less than that of the first hydroxy compound (b) and greater than that of the second hydroxy compound (c).

19. The solid electrolytic capacitor according to claim 18, which is obtained by winding a porous anode foil having a dielectric layer formed thereon and a cathode foil together with separators having a solid electrolyte supported thereon, which separators are interposed between the foils,
wherein the solid electrolyte is formed by immersion in the solution for a solid electrolytic capacitor.

20. A method for producing a solid electrolytic capacitor, wherein the solid electrolytic capacitor is obtained by winding a porous anode foil having a dielectric layer formed thereon and a cathode foil together with separators having a solid electrolyte supported thereon, which separators are interposed between the foils,
wherein the solid electrolyte layer comprises at least
(1) a conductive complex (a) of a cationized conductive polymer and a polymer anion,
(2) a first hydroxy compound (b) having four or more hydroxy groups,
(3) a second hydroxy compound (c) having an amino group and one or more hydroxy groups, and
(4) a solvent (e), and
the solid electrolyte layer is formed by applying a solution, in which the content of the conductive complex (a) is less than that of the first hydroxy compound (b) and greater than that of the second hydroxy compound (c), and then drying.

* * * * *